US010245912B2

(12) United States Patent
McGuckin et al.

(10) Patent No.: US 10,245,912 B2
(45) Date of Patent: Apr. 2, 2019

(54) TRAILER HITCH

(71) Applicant: Ford Global Technologies, LLC, Dearborn, MI (US)

(72) Inventors: John Michael McGuckin, Ann Arbor, MI (US); Sampath Rengarajan, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 38 days.

(21) Appl. No.: 15/651,696

(22) Filed: Jul. 17, 2017

(65) Prior Publication Data
US 2017/0313143 A1 Nov. 2, 2017

Related U.S. Application Data

(63) Continuation of application No. 14/952,388, filed on Nov. 25, 2015, now Pat. No. 9,731,569.

(60) Provisional application No. 62/107,275, filed on Jan. 23, 2015.

(51) Int. Cl.
*B60D 1/48* (2006.01)
(52) U.S. Cl.
CPC ............. *B60D 1/485* (2013.01); *B60D 1/488* (2013.01)
(58) Field of Classification Search
CPC .................................. B60D 1/485; B60D 1/488
See application file for complete search history.

(56) References Cited

U.S. PATENT DOCUMENTS

| 5,203,194 A | 4/1993 | Marquardt |
| 5,620,198 A | 4/1997 | Borchers |
| 6,428,031 B1 | 8/2002 | McCoy et al. |
| 6,502,848 B1 | 1/2003 | Chou et al. |
| 6,820,890 B2 | 11/2004 | Westerdale |
| 6,846,001 B2 | 1/2005 | Seksaria et al. |
| 7,100,936 B1 | 9/2006 | Cheng et al. |
| 7,699,346 B2 | 4/2010 | Wehner et al. |
| 9,457,633 B2 | 10/2016 | Krieger |
| 2006/0006626 A1 | 1/2006 | Scruggs |
| 2006/0049613 A1 | 3/2006 | Marvin et al. |
| 2008/0143125 A1* | 6/2008 | Nees ...................... B60D 1/485 293/117 |
| 2009/0072586 A1 | 3/2009 | Aghssa et al. |
| 2013/0056959 A1 | 3/2013 | Mathes et al. |
| 2016/0107493 A1 | 4/2016 | Krieger |

FOREIGN PATENT DOCUMENTS

| DE | 102009003474 A1 | 8/2009 |
| DE | 102010020649 A1 | 11/2011 |
| WO | 199857813 | 12/1998 |

* cited by examiner

*Primary Examiner* — Kevin Hurley
*Assistant Examiner* — Marlon A Arce
(74) *Attorney, Agent, or Firm* — Vichit Chea; Bejin Bieneman PLC

(57) ABSTRACT

A trailer hitch includes a cross-vehicle beam and a receiver welded to the cross-vehicle beam. The cross-vehicle beam extends from a first end to a second end. The cross-vehicle beam includes a middle section, a first round section, and a second round section. The middle section includes a flat. The first round section is integral with the middle section and extends from the middle section to the first end. The second round section is integral with the middle section and extends from the middle section to the second end. The receiver is welded directly to the flat.

20 Claims, 8 Drawing Sheets

TRAILER HITCH

CROSS-REFERENCE TO RELATED APPLICATIONS

This application is a continuation of and claims priority to and all advantages of U.S. patent application Ser. No. 14/952,388 filed on Nov. 25, 2015, which claims priority to and all the benefits of U.S. Provisional Patent Application No. 62/107,275 filed on Jan. 23, 2015, both of which are hereby incorporated by reference in their entirety.

BACKGROUND

A trailer hitch is attached to a frame of a vehicle to provide towing capability. The trailer hitch may be assembled to the frame of the vehicle during production of the vehicle, or may be installed to the vehicle as an after-market product.

The trailer hitch includes a cross-vehicle beam that is fixed to the frame of the vehicle, and a receiver fixed to the cross-vehicle beam. The receiver may receive a ball mount that engages a trailer for coupling the trailer to the vehicle to tow the trailer with the vehicle.

Several design constraints in the design of trailer hitches increases the manufacturing complexity and cost of trailer hitches. Specifically, the design of the vehicle may cause packaging constraints that require the cross-vehicle beam to be bent to avoid interference with other components of the vehicle, e.g., fascias, liftgates, underbody components, etc., when the trailer hitch is mounted to the vehicle frame. These bends must be designed so as to not reduce the strength of the cross-vehicle beam during towing and may increase the cost associated with manufacturing the trailer hitch.

As such there remains an opportunity to develop a trailer hitch that accommodates these manufacturing, packaging, and cost constraints.

DETAILED DESCRIPTION

Figure 1:
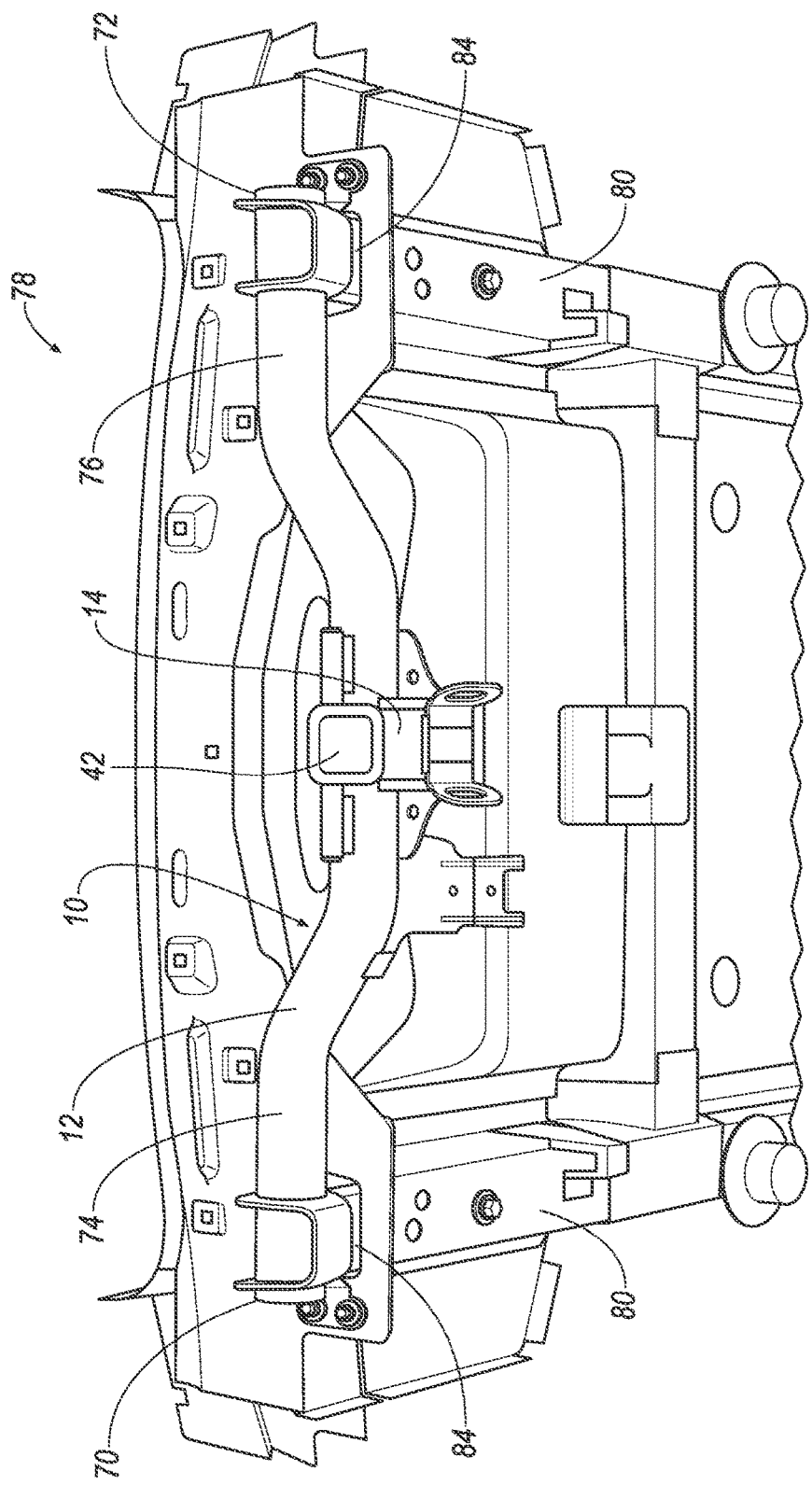
FIG. 1 is a bottom perspective view of a vehicle including a trailer hitch engaged with a frame of the vehicle.

With reference to the Figures, wherein like numerals indicate like parts throughout the several views, a trailer hitch 10 is generally shown. The trailer hitch 10 includes a cross-vehicle beam 12 extending from a first end 70 to a second end 72. The cross-vehicle beam 12 includes a middle section 34, a first round section 74, and a second round section 76. The first round section 74 is integral with the middle section 34 and extends from the middle section 34 to the first end 70. The second round section 76 is integral with the middle section 34 and extends from the middle section 34 to the second end 72. The middle section 34 includes a flat 36 and a receiver 14 welded directly to the flat 36.

Figure 2:
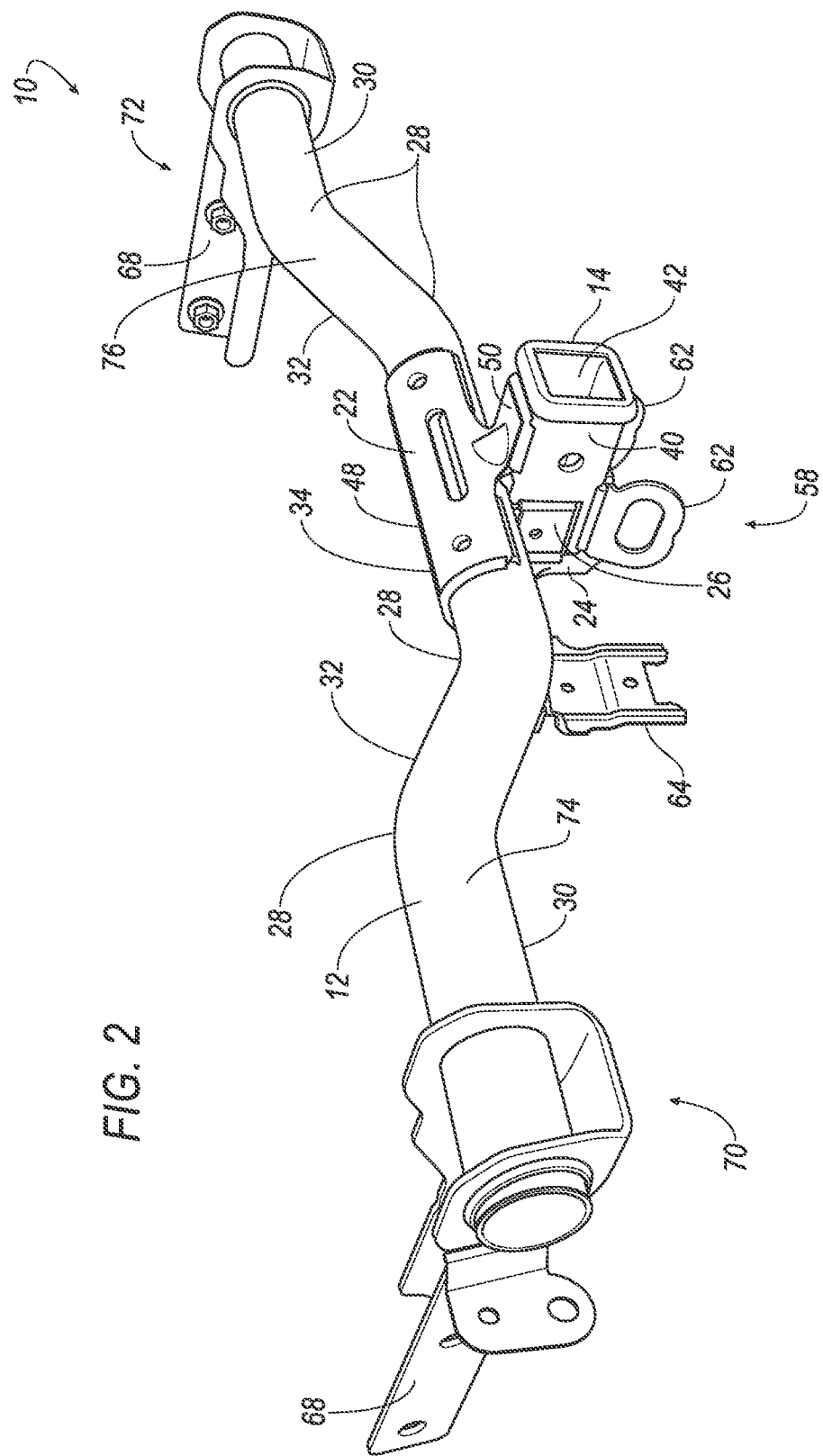
FIG. 2 is a front perspective view of the trailer hitch.

With reference to FIG. 2, the cross-vehicle beam 12 is mounted to a vehicle 78, e.g., a frame 80 of the vehicle 78, as discussed further below. The receiver 14 is configured to receive a ball mount (not shown). The ball mount supports a ball that engages a trailer for coupling the trailer to the vehicle 78 to tow the trailer with the vehicle 78.

Figure 5:
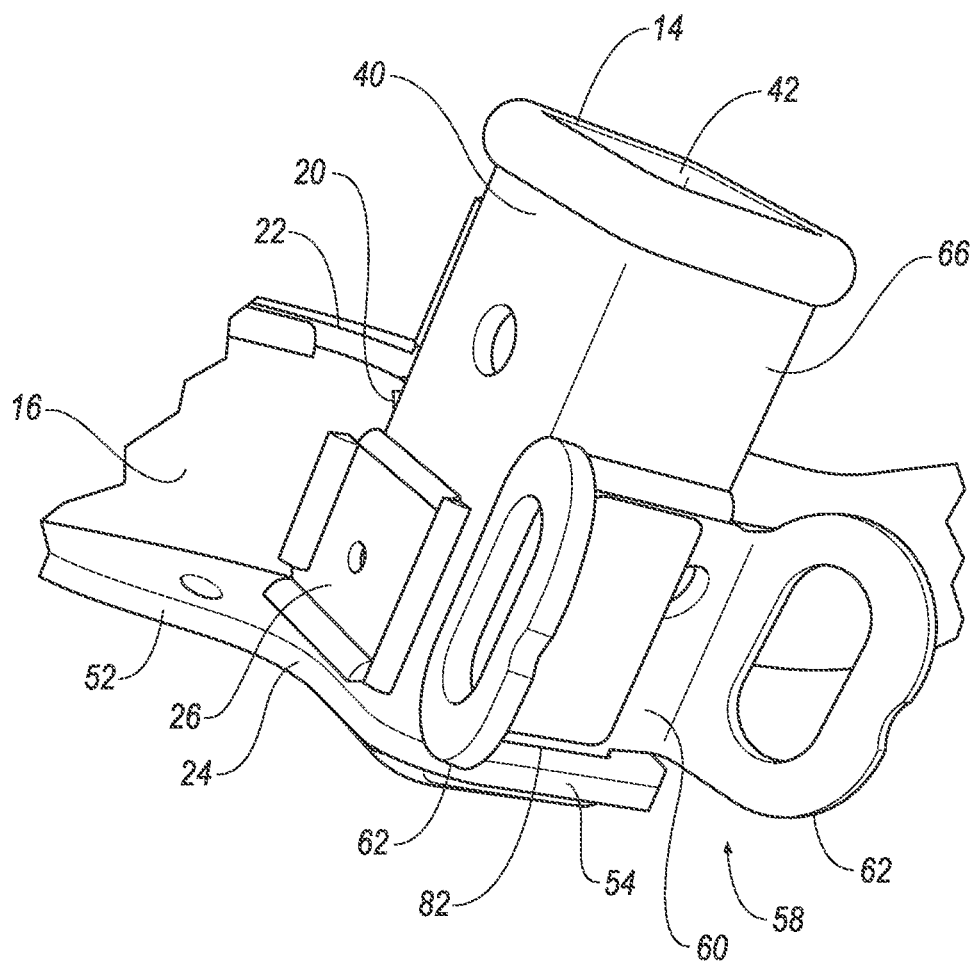
FIG. 5 is a bottom perspective view of the trailer hitch including a receiver mounted to a middle section of a cross-vehicle beam.
Figure 8:
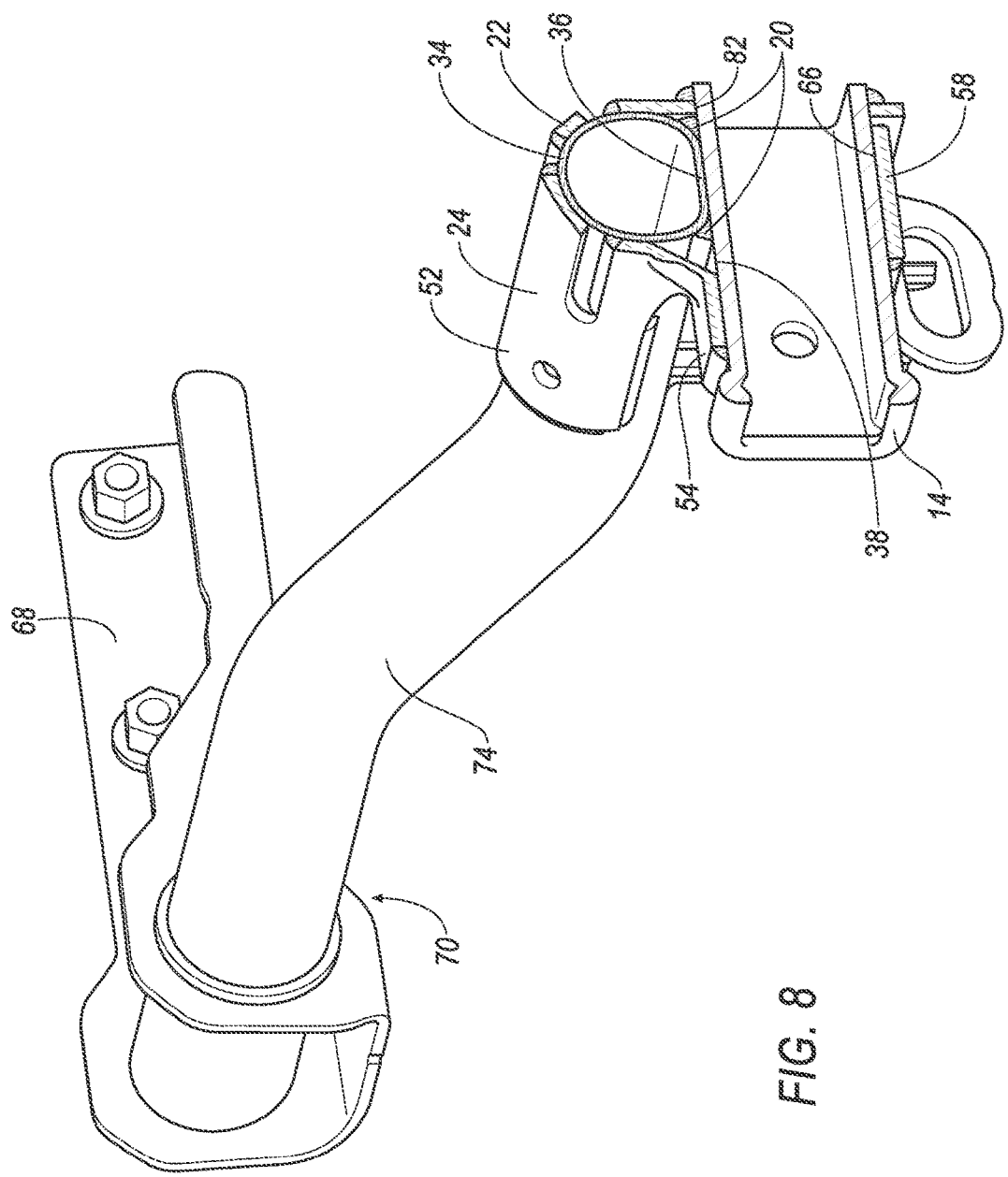
FIG. 8 is a cross-sectional view of the trailer hitch.

As best shown in FIGS. 5 and 8, a weld 20 extends directly between the flat 36 and the receiver 14, e.g., the top surface 38. As set forth above, the receiver 14 is welded directly to the flat 36, e.g., the top surface 38 of the receiver 14 is welded directly to the flat 36. In other words, the weld 20 extends directly from the receiver 14, e.g., the flat surface 38, to the flat 36. As shown in the Figures, the cross-vehicle beam 12 includes a bottom 16 and the flat 36 is defined on the bottom 16. The receiver 14 is welded directly to the bottom 16 of the cross-vehicle beam 12 at the flat 36. The weld 20 may extend directly between the bottom 16 of the cross-vehicle beam 12 and the receiver 14. It should be appreciated that multiple welds 20 may extend directly between the receiver 14 and the flat 36 at any location along the interface between the receiver 14 and the flat 36.

The weld 20 directly between the receiver 14 and the bottom 16 of the cross-vehicle beam 12 provides a direct interface between the cross-vehicle beam 12 and the receiver 14. This accomplishes improved loading conditions and an efficient load path from the receiver 14 to the cross-vehicle beam 12 and to the frame 80 of the vehicle 78. Specifically, the direct weld 20 between the receiver 14 and the bottom 16 of the cross-vehicle beam 12 results in tow loads being directly carried between the receiver 14 and the cross-vehicle beam 12. The direct weld 20 between the receiver 14 and the bottom 16 of the cross-vehicle beam 12 also reduces the complexity and weight of the hitch 10 by reducing intermediate brackets extending from the receiver 14 to the cross-vehicle beam 12.

As shown in the Figures, the cross-vehicle beam 12 has a round cross-section. In particular, the cross-vehicle beam 12 may have a circular cross-section, as shown in the Figures, i.e., may be a tube. The circular cross-section encourages uniform multi-axial loading of the cross-vehicle beam 12 during towing. Also, the circular cross-section of the cross-vehicle beam 12 is easily bent by manufacturing processes, and thus the circular-cross section reduces complexity in manufacturing.

With reference to FIGS. 1-4, the first round section 74 and the second round section 76 may each include end sections 30 for connection to the frame 80 of the vehicle 78, i.e., supporting the first end 70 and the second end 72, respectively, and intermediate sections 32 extending transversely relative to the end sections 30 to the middle section 34. The middle section 34 may extend from one of the intermediate sections 32 to the other of the intermediate sections 32. The first round section 74 and the second round section 76 may be mirror images of each other about the middle section 34. The intermediate sections 32 may extend downwardly and/or rearwardly relative to the vehicle 10. The middle section 34 and the end sections 30 may be linear and may extend along parallel axes. The end sections 30 may extend along an axis A. Specifically, the cross-vehicle beam 12 extends along an axis A from the first end 70 to the second end 72.

The cross-vehicle beam 12 may include bends 28 that position the middle section 34 downward and/or vehicle-rearward relative to the first end 70 and the second end 72 when mounted to the frame 80 of the vehicle 78, i.e., downward and/or vehicle-rearward relative to the axis A.

Specifically, the cross-vehicle beam 12 may include at least one bend 28 between the first round section 74 and the middle section 34, and the cross-vehicle beam 12 may include at least one bend 28 between the second round section 76 and the middle section 34. For example, as shown in the Figures, the cross-vehicle beam 12 includes two bends 28 between the first round section 74 and the middle section 34, i.e., one bend 28 extending from the middle section 34 to the intermediate section 32 of the first round section 74 and one bend 28 between the intermediate section 32 and the end section 30 of the first round section 74. Similarly, for example, as shown in the Figures, the cross-vehicle beam 12 includes two bends 28 between the second round section 76 and the middle section 34, i.e., one bend 28 extending from the middle section 34 to the intermediate section 32 of the second round section 76 and one bend 28 between the intermediate section 32 and the end section 30 of the first round section 76.

The bends 28 may be multi-axial. For example, as shown in the Figures, the bends 28 may extend upwardly relative to the frame 80 from the middle section 34 to the first round section 74, and from the middle section 34 to the second round section 76, i.e., the middle section 34 may be lower than the first round section 74 and the second round section 76 when mounted to the frame 80. As another example, in addition to, or in the alternative to the upward extension of the bends 28 from middle section 34 to the first round section 74 and the second round section 76, the bends 28 may extend inwardly relative to the vehicle frame 80 from the middle section 34 to the first round section 74, and from the middle section 34 to the second round section 76, i.e., the middle section 34 may be disposed in a vehicle-rearward direction relative to the first round section 74 and the second round section 76.

The bends 28, e.g., the multi-axial bends, may allow for packaging the hitch 10 within packaging constraints of the vehicle design and efficient connection between the frame 80 of the vehicle 78. For example, the multi-axial bends 28 allow the cross-vehicle beam 12 to be fit between structural components of the vehicle and without interfering with components that have class-A outer surfaces, e.g., fascias and liftgates.

As set forth above, the first round section 74 is integral with the middle section 34, and the second round section 76 is integral with the middle section 34. In other words, the first round section 74, the middle section 34, and the second round section 76 are formed simultaneously as a single continuous unit. In this configuration, the cross-vehicle beam 12 is formed as a single continuous unit from the first end 70 to the second end 72. Alternatively, the first round section 74 and/or the second round section 76 may be formed separately from the middle section 34 and subsequently attached to the middle section 34.

Figure 7:
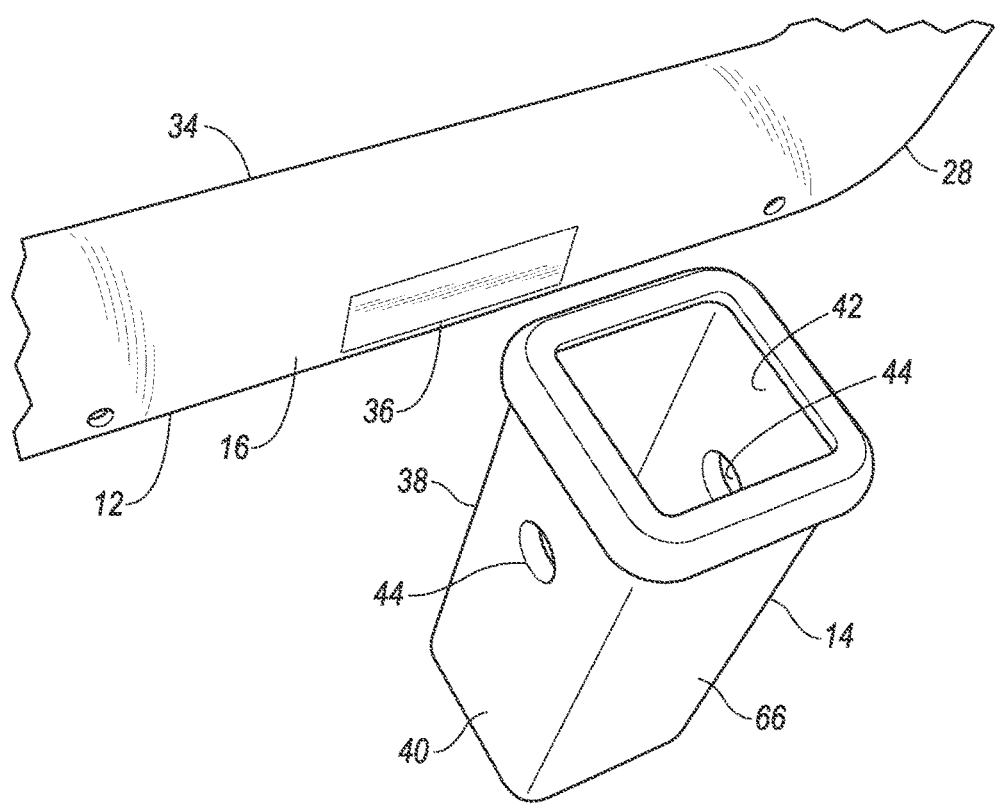
FIG. 7 is an exploded view of the receiver and the middle section of the cross-vehicle beam showing a flat on the middle section.

With reference to FIGS. 7 and 8, the flat 36 may be defined on the bottom 16 of the cross-vehicle beam 12. The bottom 16 may face the ground when the hitch 10 is installed to the frame 80 of the vehicle 78. The flat 36 may be positioned on the bottom 16 of the cross-vehicle beam 12 to be parallel to the ground below the vehicle 78 when the hitch 10 is installed to the frame 80 of the vehicle 78. The flat 36 facilitates direct welding of the receiver 14 to the bottom 16 of the cross-vehicle beam 12.

The receiver 14 presents a top surface 38 that abuts the flat 36 on the cross-vehicle beam 12. In other words, top surface 38 contacts the flat 36 on the cross-vehicle beam 12. The top surface 38 may be flat to match the flat 36 on the cross-vehicle beam 12. The receiver 14 is welded to the cross-vehicle beam 12 to fix the receiver 14 in position with the top surface 38 abutting the flat 36. For example, one or more welds, e.g., weld 20, may extend between the receiver 14 and the cross-vehicle beam 12 along the top surface 38 and the flat 36. The welds may, for example, extend from the top surface 38 and/or a side surface 40 of the receiver 14 to the flat 36 and/or to a round portion (not numbered) of the cross-vehicle beam 12 adjacent the flat 36. As set forth above, this direct weld 20 between the receiver 14 and the bottom 16 of the cross-vehicle beam 12 accomplishes improved loading conditions, an efficient load path, and reduction in the complexity and weight of the hitch 10.

The receiver 14 defines a channel 42 configured to receive the ball mount. The channel 42 may be rectangular in cross-section. The channel 42 may extend through the receiver 14. The receiver 14 may define holes 44 extending through the receiver 14 and through the channel 42 for receiving a pin (not shown) to connect the ball mount to the receiver 14.

The trailer hitch may include braces 22, 24 and/or reinforcements 26. The braces 22, 24 and reinforcements 26 may be welded to the cross-vehicle beam 12, e.g., the middle section 34, and to the receiver 14. The braces 22, 24 and/or reinforcements 26 reinforce the welds 20 that extend directly from the cross-vehicle beam 12 to the receiver 14. The hitch 10, specifically, may include a rear brace 22, a front brace 24, and two reinforcements 26. However, it should be appreciated that the hitch 10 may include no braces or reinforcements, or may include any suitable number of braces or reinforcements. It should be appreciated that the adjectives, "first," "second," etc. to describe the braces 22, 24 and/or reinforcements 26 are used herein merely as identifiers and not to signal order or importance.

With reference to FIG. 2, the rear brace 22 may be welded to the top surface 38 and to the middle section 34. The rear brace 22 may curve along a circular shape of the middle section 34 and may include a tab 50, also referred to as a thin portion 50, welded to the top surface 38. Specifically, the rear brace 22 may include a wide portion 48 extending along and abutting the middle section 34 of the cross-vehicle beam 12, and tab 50 extending transversely to the wide portion 48 and abutting the top surface 38 of the receiver 14. The wide portion 48 of the rear brace 22 may be welded to the middle section 34 of the cross-vehicle beam 12 and the tab 50 may be welded to the top surface 38 of the receiver 14.

Figure 3:
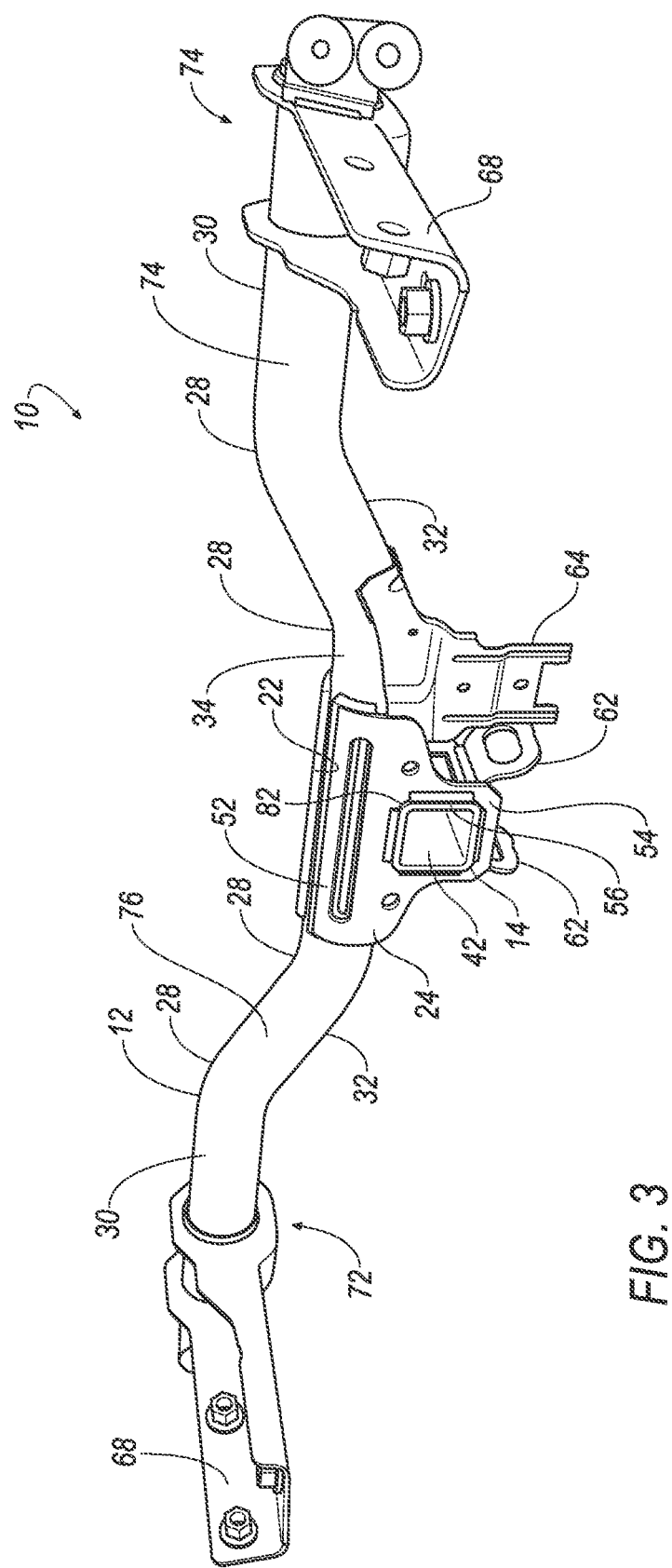
FIG. 3 is a rear perspective view of the trailer hitch.
Figure 4:
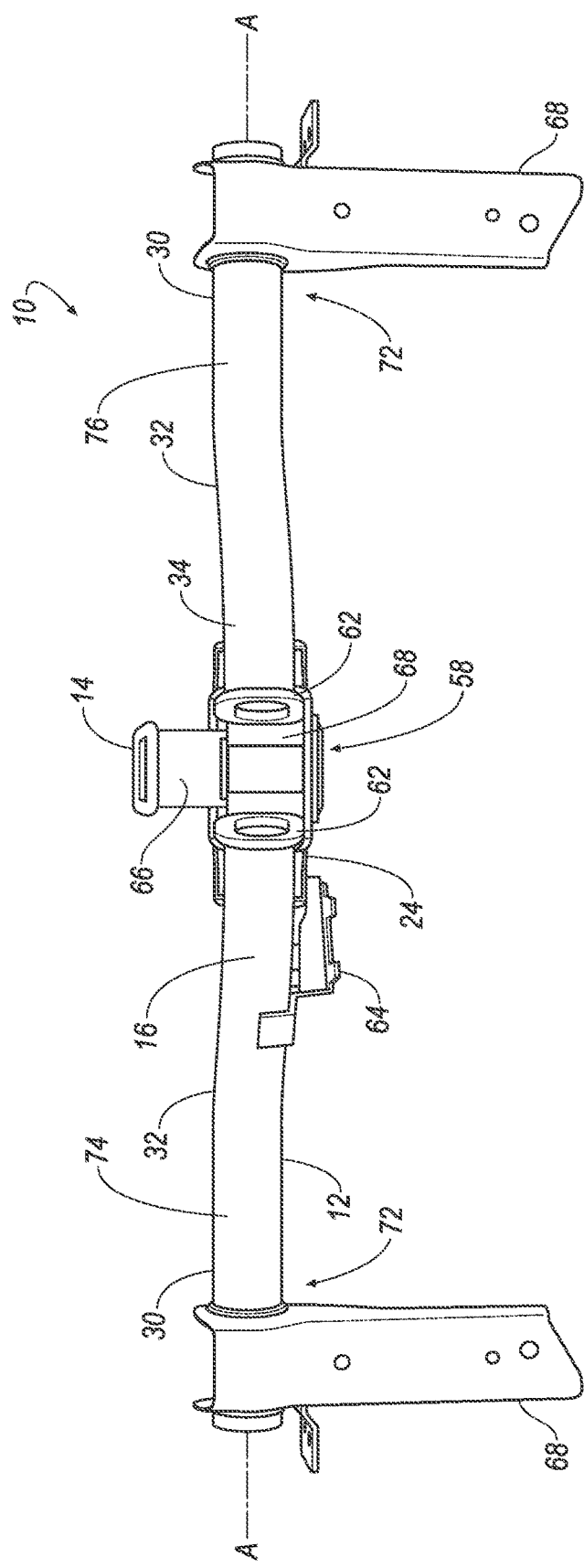
FIG. 4 is a bottom view of the trailer hitch.

With reference to FIG. 3, the front brace 24, also referred to as the second brace 24, may be welded to the middle section 34. The front brace 24 may include hole 82 receiving the receiver 14. The receiver 14 may be welded to the front brace 24 about the hole 82. The front brace 24 may include a wide portion 52 extending along and abutting the middle section 34 of the cross-vehicle beam 12 and a flange 54 extending along a front surface 56 of the receiver 14. The wide portion 52 of the front brace 24 may be welded to the middle section 34 of the cross-vehicle beam 12 and the flange 54 may be welded to the front surface 56, the side surfaces 40, the top surface 38, and/or a bottom 66 of the receiver 14.

The rear brace 22 and the front brace 24 extend along opposite sides of the middle section 34, e.g., a front side and a rear side. In other words, the middle section 34 is sandwiched between the rear brace 22 and the front brace 24. The receiver 14 extends along the middle section 34, e.g., below the middle section 34, from the front brace 22 to the rear brace 24.

Figure 6:
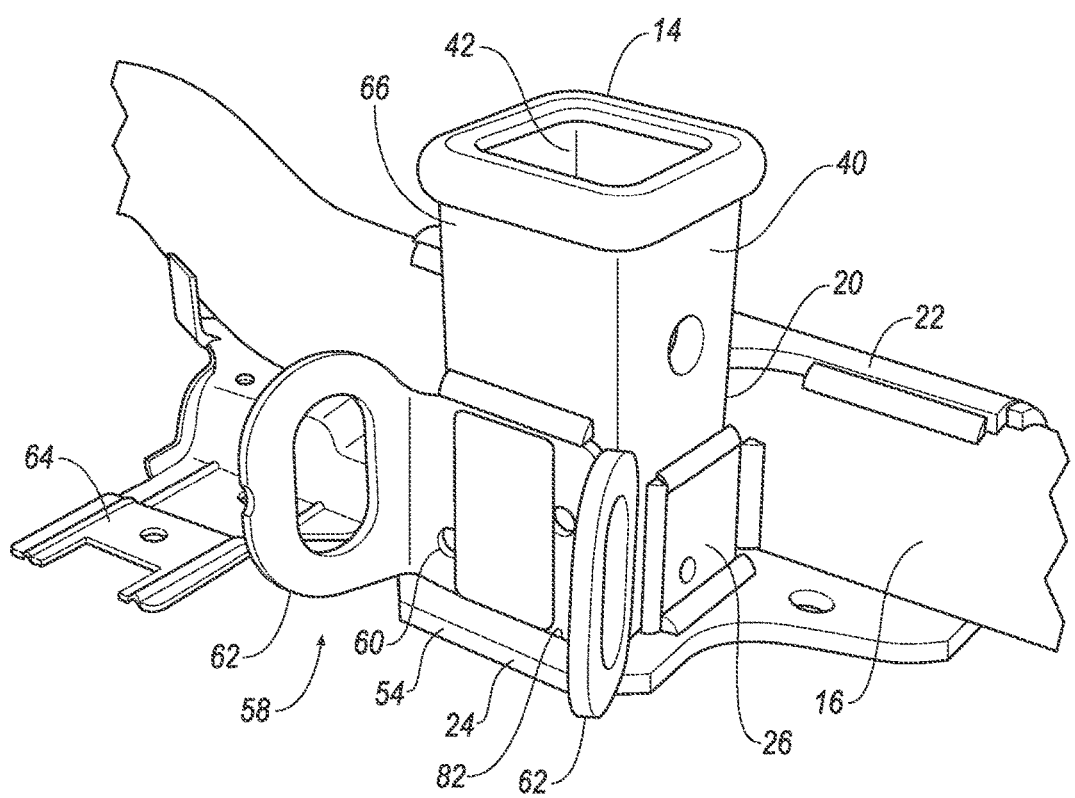
FIG. 6 is another bottom perspective view of the trailer hitch.

With reference to FIGS. 5 and 6, the side surfaces 40 of the receiver 14 extend from the top surface 38 to a bottom 66 of the receiver 14. The reinforcements 26 are welded to the middle section 34 and to the side surface 40. The reinforcements 26 may be welded to the bottom 16 of the cross-vehicle beam 12, e.g., to the flat 36.

The reinforcements 26 may abut the side surfaces 40 of the receiver 14 and the bottom 16 of the cross-vehicle beam 12. Alternatively, or in addition, the reinforcements 26 may abut the flange 54 of the front brace 24. The reinforcements 26 may be welded to the side surfaces 40 of the receiver 14, the bottom of the cross-vehicle beam 12, and/or the flange 54 of the front brace 24.

The hitch 10 may include a chain plate 58 for attaching chains to the hitch 10. The chains may be connected to the trailer to couple the trailer to the vehicle in the event that the tongue of the trailer becomes disengaged with the hitch 10, e.g., upon ball failure, ball plate failure, pin failure, etc.

The chain plate 58 may include a base 60 and two sides 62. The sides 62 may define holes for engaging chains. The sides 62 may extend downwardly from the base 60 when the hitch 10 is mounted to the vehicle.

The base 60 abuts the bottom 16 of the receiver 14 and may be welded to the bottom 16. Such a configuration provides adequate hand access for both installing the pin 46 as well as chain attachment. Space for mounting the base 60 to the bottom 16 of the receiver 14 is made possible by the absence of additional brackets that eliminated by welding the receiver 14 directly to the bottom surface of the cross-vehicle beam 12.

The hitch 10 may include a wiring bracket 64 for supporting wiring and/or electronic components of the vehicle for connection to the trailer to power and/or control lights on the trailer. The wiring bracket 64 may be welded to the cross-vehicle beam 12 and/or the receiver 14.

The hitch 10 may include mounting brackets 68 for mounting the hitch 10 to the vehicle. The brackets 68 extend transverse to the axis A and engaging the frame 80. The mounting brackets 68 may be fixed to the end sections 30 of the cross-vehicle beam 12. Specifically, one of the mounting brackets 68 is disposed at the first end 70 and the other mounting bracket 68 is disposed at the second end 72. The mounting brackets 68 may be welded to the end sections 30.

The brackets 68 are configured to engage the frame 80 of a vehicle 78. The frame 80 includes two open ends 84 spaced from each other, and brackets 68 are engaged with the frame 80 in the open ends 84. The brackets 68 may be fastened and/or welded to the frame 80 in the open ends 84.

The cross-vehicle beam 12, the receiver 14, the brackets 22, 24, 26, the chain plate 58, and/or the mounting brackets 68 may be formed of metal, such as steel. The cross-vehicle beam 12, the receiver 14, the braces 22, 24, the reinforcements 26, the chain plate 58, and/or the mounting brackets 68 may be formed of the same type of material or may be formed of different types of material.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A trailer hitch comprising:
a cross-vehicle beam extending from a first end to a second end;
the cross-vehicle beam including a middle section, a first round section integral with the middle section and extending from the middle section to the first end, and a second round section integral with the middle section and extending from the middle section to the second end;
wherein, in cross-section, the middle section includes a flat extending from a forward end to a rearward end, and a curved portion curving from the forward end to the rearward end;
the flat having a midpoint between the forward end and the rearward end and a center line extending through the midpoint perpendicular to the flat, the curved portion being symmetrical about the center line; and
a receiver welded directly to the flat.

2. The trailer hitch as set forth in claim 1 wherein the receiver includes a flat top surface abutting the flat.

3. The trailer hitch as set forth in claim 2 wherein the flat top surface is welded to the flat.

4. The trailer hitch as set forth in claim 1 wherein the receiver includes a flat top surface.

5. The trailer hitch as set forth in claim 4 wherein the flat top surface is welded to the flat.

6. The trailer hitch as set forth in claim 1 further comprising a front brace abutting and welded to the curved portion of the middle section, the front brace including a hole receiving the receiver, the receiver being welded to the front brace about the hole.

7. The trailer hitch as set forth in claim 6, wherein the receiver includes a flat top surface, and further comprising a rear brace spaced from the front brace, the rear brace including a tab welded to the flat top surface and a wide portion extending from the tab, the wide portion abutting and welded to the circular arc of the middle portion.

8. The trailer hitch as set forth in claim 1 wherein the curved portion curves continuously from the forward end to the rearward end.

9. The trailer hitch as set forth in claim 7 wherein the receiver includes a side surface extending from the flat top surface, and further comprising a reinforcement abutting and welded to the middle section and to the side surface.

10. The trailer hitch as set forth in claim 1 wherein the receiver includes a side surface extending from the flat top surface, and further comprising a reinforcement welded to the middle section and to the side surface.

11. The trailer hitch as set forth in claim 1 wherein the cross-vehicle beam includes a bend between the first round section and the middle section, and wherein the cross-vehicle beam includes a bend between the second round section and the middle section.

12. The trailer hitch as set forth in claim 1 further comprising a bracket at the first end and at the second end, the brackets being configured to engage a frame of a vehicle.

13. A towing assembly comprising:
a vehicle frame;
a trailer hitch including a cross-vehicle beam extending from a first end to a second end and fixed to the vehicle frame;
the cross-vehicle beam including a middle section, a first round section extending from the middle section to the first end, and a second round section extending from the middle section to the second end;
wherein the cross-vehicle beam includes bends extending upwardly and inwardly relative to the vehicle frame from the middle section to the first round section and from the middle section to the second round section;
wherein, in cross-section, the middle section includes a flat extending from a forward end to a rearward end, and a curved portion curving from the forward end to the rearward end;

the flat having a midpoint between the forward end and the rearward end and a center line extending through the midpoint perpendicular to the flat, the curved portion being symmetrical about the center line; and a receiver welded directly to the flat.

14. The towing assembly as set forth in claim 13 wherein the first round section and the second round section are integral with the middle section.

15. The towing assembly as set forth in claim 13 wherein the vehicle frame includes two open ends spaced from each other, and the trailer hitch includes brackets engaged with the vehicle frame in the open ends.

16. The towing assembly as set forth in claim 15 wherein the brackets are disposed at the first and second ends of the cross-vehicle beam.

17. The towing assembly as set forth in claim 13, wherein the first round section and the second round section extend along an axis, and further comprising brackets extending transverse to the axis and engaging the vehicle frame.

18. The trailer hitch as set forth in claim 13 wherein the receiver includes a flat top surface, and further comprising a rear brace including a tab abutting and welded to the flat top surface and a wide portion extending from the tab, the wide portion abutting and welded to the circular arc of the middle section.

19. The trailer hitch as set forth in claim 18 further comprising a front brace spaced from the rear brace, the front brace abutting and welded to the curved portion of the middle section, the front brace including a hole receiving the receiver, the receiver being welded to the front brace about the hole.

20. The trailer hitch as set forth in claim 19 wherein the receiver includes a side surface extending from the flat top surface, and further comprising a reinforcement welded to the middle section and to the side surface.

* * * * *